United States Patent
Heck (10) Patent No.: US 6,671,672 B1
(45) Date of Patent: Dec. 30, 2003

(54) VOICE AUTHENTICATION SYSTEM HAVING COGNITIVE RECALL MECHANISM FOR PASSWORD VERIFICATION

(75) Inventor: Larry P. Heck, Sunnyvale, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/281,356

(22) Filed: Mar. 30, 1999

(51) Int. Cl.[7] ............................................. G10L 17/00
(52) U.S. Cl. ........................................................ 704/273
(58) Field of Search ................................ 704/270–275, 704/246–250, 235; 370/352; 375/220; 380/30

(56) References Cited

U.S. PATENT DOCUMENTS

| | | | | |
|---|---|---|---|---|
| 4,975,957 A | * | 12/1990 | Ichikawa et al. | 704/235 |
| 5,436,972 A | * | 7/1995 | Fischer | 380/30 |
| 5,546,463 A | * | 8/1996 | Caputo et al. | 375/220 |
| 5,805,674 A | * | 9/1998 | Anderson, Jr. | 704/273 |
| 5,867,495 A | * | 2/1999 | Elliott et al. | 370/352 |
| 6,263,447 B1 | * | 7/2001 | French et al. | 380/30 |

OTHER PUBLICATIONS

"Welcome to Yahoo! Sign Up!" Yahoo! Inc., © 1994–1998, 2 pages.

* cited by examiner

Primary Examiner—David D. Knepper
(74) Attorney, Agent, or Firm—Blakely, Sokoloff, Taylor & Zafman LLP (57) ABSTRACT

A voice authentication system having a cognitive recall mechanism for password verification is provided. A user is enrolled for password verification by receiving a first voice input from the user representing the password prompt and a second voice input representing a correct response to the password prompt. The first and second voice inputs may be stored as waveforms, as voiceprints, recognized speech data, or a combination thereof. During verification, the identity of the user is verified by outputting the user-provided password prompt and evaluating a response to password prompt against the correct response. Thus, the user is able to select his own password prompt to facilitate cognitive recall of the password during a subsequent verification phase.

39 Claims, 6 Drawing Sheets

VOICE AUTHENTICATION SYSTEM HAVING COGNITIVE RECALL MECHANISM FOR PASSWORD VERIFICATION

FIELD OF THE INVENTION

The present invention pertains to the field of voice authentication. More particularly, the present invention relates to techniques for performing password verification in a voice authentication system.

BACKGROUND OF THE INVENTION

Voice authentication is a technique by which the identity of a person is determined or verified based on his voice. Such techniques are required in many fields, such as telephone banking and investing. In these applications, a person may make or redeem investments or transfer balances over the telephone using only his voice, without a human operator on the other end of the telephone connection. Voice authentication systems commonly assign a password to each user to facilitate identification. The password typically is a computer-assigned Personal Identification Number (PIN), random digit string, or random phrase. However, users of voice authentication systems often prefer to select their own personalized password. One problem with allowing them to do so, however, is that users tend to forget the password they selected.

A simple approach to enabling a user to remember his password is to direct the user to select a password of a predetermined type that is easy to remember, such as his mother's maiden name. This approach, however, is overly restrictive of the user's choices of passwords and is therefore undesirable. Another approach is to avoid the use of passwords and simply ask users to repeat short phrases during enrollment and authentication. This approach is also undesirable, because it is time-consuming, adds complexity to the voice authentication system, and can be annoying to the user.

SUMMARY OF THE INVENTION

The present invention includes a method and apparatus for enrolling a user for voice authentication. The method includes outputting a first prompt designed to elicit a first utterance from the user, and then receiving and storing the first utterance as a password prompt for the user. The method further includes outputting a second prompt designed to elicit a second utterance from the user, and then receiving and storing the second utterance as a password corresponding to the password prompt.

Another aspect of the present invention further is a method and apparatus for performing voice authentication. The method includes outputting a password prompt to the user which is representative of an utterance previously received from the user and which corresponds to a password for the user, and then verifying the user based on whether a spoken response to the password prompt is received which matches the password. The present invention further includes embodiments in which such enrollment and authentication are combined.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for facilitating cognitive recall of a password in a voice authentication system. As will be described in detail below, the system enrolls a user for password verification by receiving a voice input from the user representing the password prompt and another voice input representing a correct response to the password prompt. The voice inputs may be stored as waveforms, as voiceprints, recognized speech data, or a combination thereof. During password verification, the system verifies the identity of the user by outputting the user-provided password prompt and evaluating a response to password prompt against the correct response. As a result, the user is able to select his own password prompt to facilitate cognitive recall of the password during a subsequent verification phase.

The voice authentication system and the included cognitive recall technique may be embodied in software, either in whole or in part. That is, the voice authentication system may be carried out in a computer system in response to its central processing unit (CPU) executing sequences of instructions contained in memory. The instructions may be executed from memory and may be loaded from a persistent store, such as a mass storage device and/or from one or more other remote computer systems (collectively referred to as "host computer system"). In the latter case, for example, a host computer system may transmit a sequence of instructions to the ("target") computer system in response to a message transmitted to the host computer system over a network by target computer system. As the target computer system receives the instructions via the network connection, the target computer system stores the instructions in memory. The target computer system may store the instructions for later execution or execute the instructions as they arrive over the network.

In some cases, the downloaded instructions may be directly supported by the CPU of the target computer system. Consequently, execution of the instructions may be performed directly by the CPU. In other cases, the instructions may not be directly executable by the CPU. Under those circumstances, the instructions may be executed by causing the CPU to execute an interpreter that interprets the instructions or by causing the CPU to execute instructions which convert the received instructions to instructions which can be directly executed by the CPU.

In various embodiments of the present invention, hard-wired circuitry may be used in place of, or in combination with, software instructions to implement the present invention. Thus, the present invention is not limited to any specific combination of hardware circuitry and software, nor to any particular source for the instructions executed by a computer system.

Figure 1:
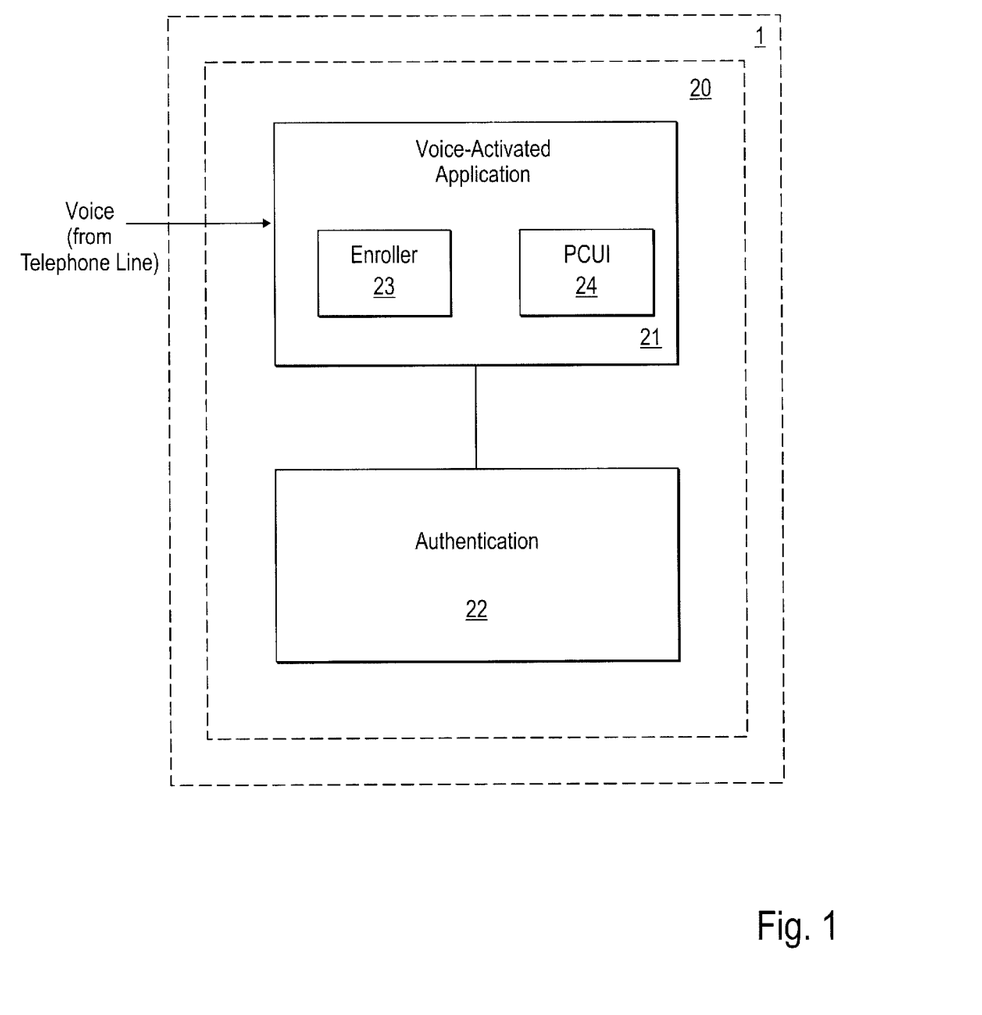
FIG. 1 illustrates a computer system including a voice-activated application and authentication software.

FIG. 1 illustrates a voice authentication system in which the described cognitive recall technique for password verification can be implemented. As shown, a computer system 1 includes a voice-activated software application (henceforth simply "application") 21, which is functionally coupled to authentication software 22. The application 21 and the authentication software 22 are stored in, and execute from, memory 20 within the computer system 1. The computer system 1 may be, for example, a server computer system or a client computer system maintained by a business entity such as a bank or an investment brokerage. Alternatively, computer system 1 may be a combination of two or more computer systems; for example, the application 21 might execute within a client computer system while the authentication software 22 executes within a server computer system.

Hence, the application 21 may be, for example, a software application for enabling bank customers or investors, respectively, to perform transactions by voice over a telephone. The application 21 receives voice input from a remote caller via a telephone line. As shown, the application 21 includes an enroller component 23 and a password control user interface (PCUI) component 24. As will be described in detail below, the enroller 23 is used to enroll a user for password verification in accordance with the present invention, while the PCUI 24 provides an interactive audio interface with a telephone caller and coordinates the enrollment and verification processes in accordance with the present invention. These functions are performed in cooperation with functions performed by the authentication software 22, which is described in detail below.

Figure 2:
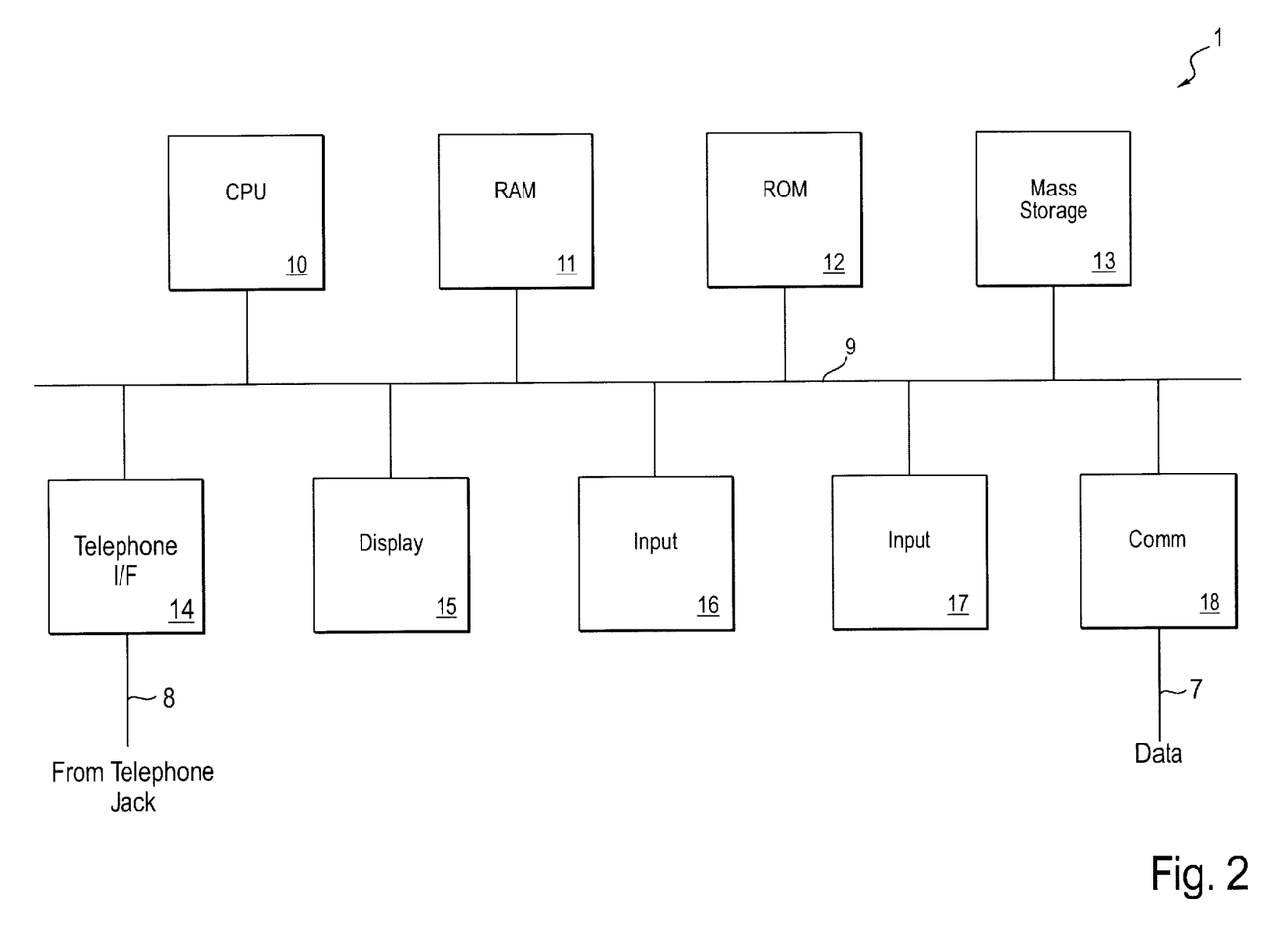
FIG. 2 is a block diagram of the components of a computer system in which the present invention can be implemented.

FIG. 2 is a block diagram showing the hardware components of computer system 1, according to one embodiment. Note, however, that computer system 1 may alternatively represent multiple, physically distinct computer systems, as noted above. In the embodiment shown in FIG. 2, the computer system 1 includes a microprocessor (CPU) 10, random access memory (RAM) 11, read-only memory (ROM) 12, and a mass storage device 13, each connected to a bus system 9. Memory 20, in which the application 21 and the authentication software 22 reside (FIG. 2), may represent RAM 11, ROM 12, mass storage device 13, or any combination thereof. The bus system 9 may include one or more buses connected to each other through various bridges, controllers and/or adapters, such as are well-known in the art. For example, the bus system 9 may include a main bus, or "system bus", that is connected through an adapter to one or more expansion buses, such as a Peripheral Component Interconnect (PCI) bus.

Also coupled to the bus system 9 are a telephone interface 14, a display device 15, a number of different input devices 16 and 17, and a data communication device 18. The telephone interface 14 includes the hardware that connects the computer system 1 to the telephone line 8 to provide a voice interface with a telephone caller. The telephone interface 14 provides functions such as analog-to-digital (A/D) conversion, echo cancellation, and other types of signal conditioning, as well as a voice activity detector (VAD) (sometimes referred to as an "endpointer") function for determining the temporal boundaries of a telephone caller's speech. Such devices are well-known in the art and are commercially available.

Mass storage device 13 may include any suitable device for storing large volumes of data, such as a magnetic disk or tape, magneto-optical (MO) storage device, or any of various types of Digital Versatile Disk (DVD) or compact disk (CD-X) storage. The display device 18 may be any suitable device for displaying alphanumeric, graphical and/or video data to a user, such as a cathode ray tube (CRT), a liquid crystal display (LCD), or the like, and associated controllers. The input devices 16 and 17 may include any of various types of input devices, such as a keyboard, and mouse, touchpad, or trackball, or a microphone for speech input. The communication device 18 may be any device suitable for or enabling the computer system 1 to communicate data with another computer system over a communication link 7, such as a conventional telephone modem, a cable television modem, an Integrated Services Digital Network (ISDN) adapter, a Digital Subscriber Line (xDSL) adapter, a network interface card (NIC), an Ethernet adapter, or the like. Note that many variations upon the embodiment of FIG. 2 can also support the techniques described herein.

Figure 3:
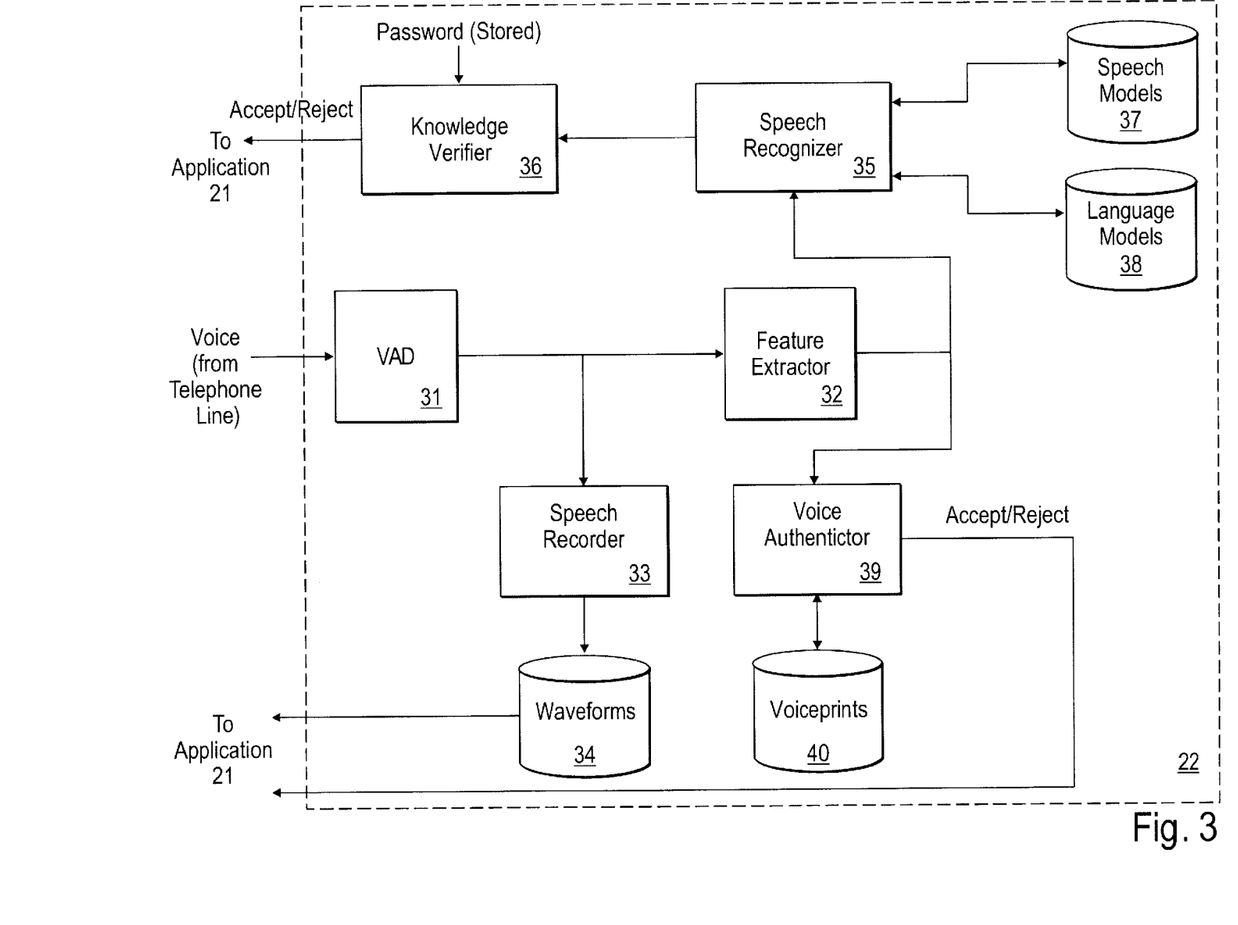
FIG. 3 illustrates components of the authentication software.

FIG. 3 illustrates the components of the authentication software 22, according to one embodiment. As shown, the authentication software 22 includes a voice activity detector (VAD) 31, a feature extractor 32, a speech recorder 33, a voice authenticator 39, a speech recognizer 35, a knowledge verifier 36, and several databases 34, 37, 38 and 40. The VAD 31, which is associated with hardware in the telephone interface 14, receives voice inputs from an incoming telephone call and provides output indicating the temporal boundaries of a caller's speech to the feature extractor 32 and the speech recorder 33. Note that in certain embodiments, separate feature extractors may be provided to support speech recognition and verification. Thus, feature extractor 32 may represent multiple feature extractors to support various different functions. The speech recorder 33 receives the output of the VAD 31 and stores this output as waveforms in database 34. The feature extractor 32 extracts speech features from the output of the VAD 31 using techniques which are well-known in the art of speech recognition. The output of the feature extractor 32 is provided to both the voice authenticator 39 and the speech recognizer 35. The voice authenticator 39 accesses stored voiceprints in database 40 to determine if the voice of the current caller matches a voiceprint stored in database 40. The output of the voice authenticator 39 is an "accept" or "reject" signal (i.e., match or no match), as appropriate, which is provided to the application 21. The speech recognizer 35 performs speech recognition in a conventional manner based on the output of the feature extractor 32 and speech models and language models stored in databases 37 and 38, respectively. The output of the speech recognizer 35 is provided to the knowledge verifier 36 and may be in American Standard Code for Information Interchange (ASCII) format or any other suitable format. Knowledge verifier 36 compares the content of the output of the speech recognizer 35 with a specified content, such as a stored password, and outputs an "accept" or "reject" signal to the application 21, accordingly.

Voice authentication may be viewed as including two distinct phases, an enrollment phase and a verification phase. The enrollment phase is the process in which the system configures itself for a particular user (e.g. a telephone caller) for later voice authentication, including establishing a password for the user. The verification phase is the process in which the identity of a telephone caller is verified using previously established enrollment data, including verifying the password. As noted above, the verification system of the present invention implements a cognitive recall technique which enables the user to more easily remember his password. In particular, the user is allowed to create his own password prompt during an enrollment phase, which is stored and later used to prompt the user for his password during a subsequent verification phase. The user is instructed to generate the password prompt such that the password represents the correct answer or response to the password prompt. The password prompt may be in the form of a question, although that need not be the case. The password prompt further may be in the form of a complete sentence or just a phrase.

An example of the cognitive recall technique will now be described. When a telephone caller first contacts the computer system 1 and initiates the enrollment phase, the enroller 23 and password control UI 24 cooperate to provide an audible prompt to the caller over the telephone line, such as, "Please make up a question that the system can ask you at a later time to verify your identity." The caller then chooses the password prompt and speaks it into the telephone. An example of a caller's password prompt might be, "What is the telephone number for Aunt Beth?" The password prompt is then recorded using speech recorder 33 or recognized using speech recognizer 35 and stored in any appropriate format. The computer system 1 then prompts the caller for the actual password by stating, for example, "Please provide the answer to the password question." The caller then responds with the password, for example, "Area code 650, 555, 5555." The password may be recognized using speech recognizer 35 and stored, or it may be stored in the form of one or more voiceprints in database 40.

During the verification phase, the password prompt is output to the telephone caller in an appropriate manner, depending upon how it was stored during the enrollment phase (i.e., recorded as opposed to speech-recognized). If the password prompt was simply recorded, then the recording is simply played back to the telephone caller during verification. On the other hand, if the password prompt was recognized using speech recognizer 35 during enrollment, then it may be output to the telephone caller during verification using a speech synthesizer. The user's response to the password question (i.e., the password) may be evaluated by using voice authenticator 39 to compare it to previously acquired voiceprints of the user's voice or by using speech recognizer 35 in conjunction with knowledge verifier 36.

Thus, the present invention provides a cognitive recall mechanism by enabling a user to choose his own password prompt as well as the corresponding password. The user may therefore select a password prompt and corresponding password that are uniquely personal. By providing this cognitive recall mechanism, the voice authentication system retains its flexibility and ease-of-use and reduces the frequency of user's forgetting their passwords. This capability therefore reduces the need for costly human intervention, which reduces costs for businesses that use a voice authentication system.

Figure 4:
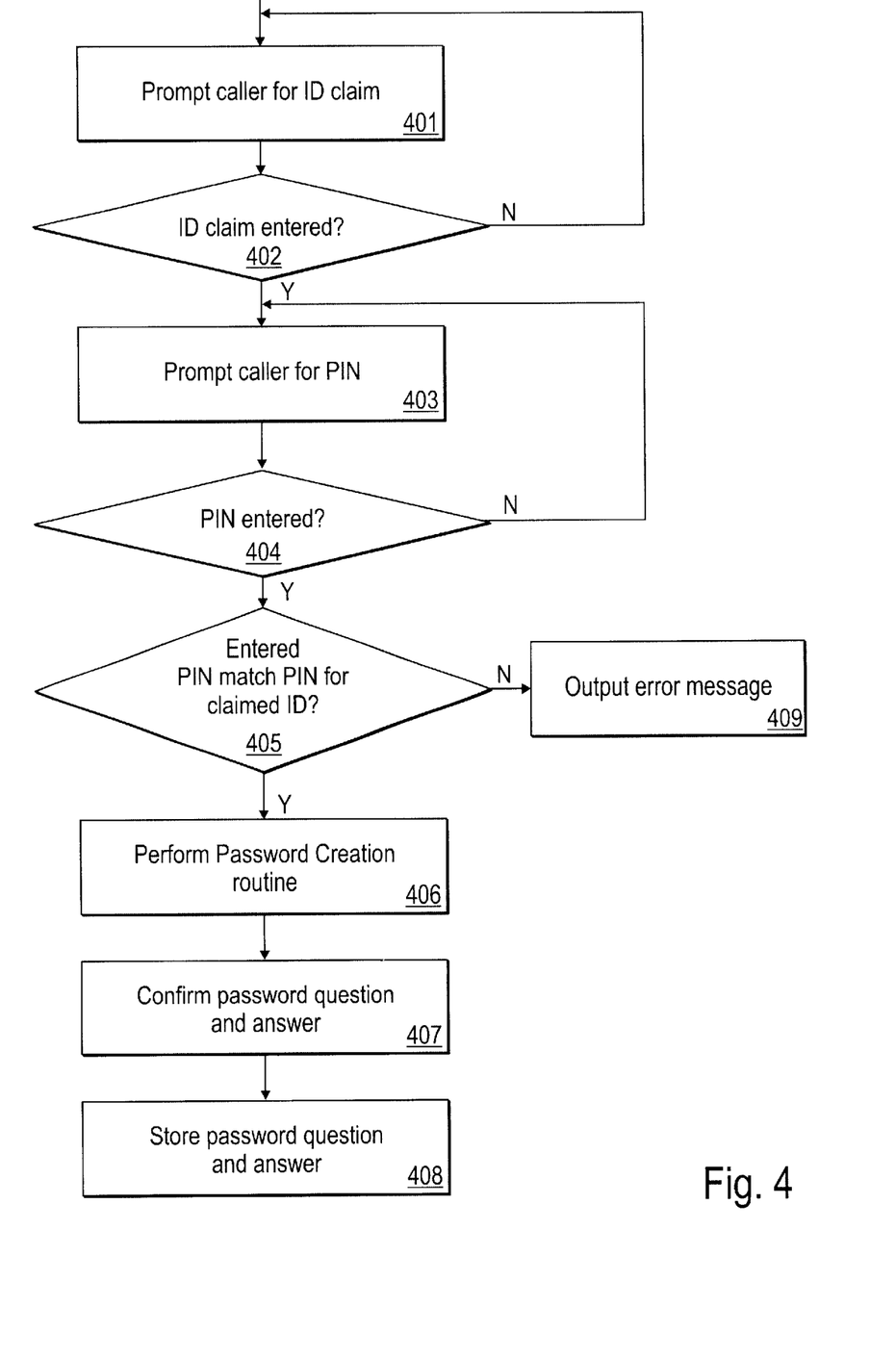
FIG. 4 is a flow diagram illustrating routine for enrolling a user for voice-based password verification.

FIG. 4 shows a routine that may be implemented in the computer system 1 to enroll a user for voice-based password verification. In one embodiment, the routine is performed by the enroller 23 in cooperation with the PCUI 24 and the authentication software 22. At 401, the system prompts the caller for an ID claim. The ID claim may be, for example, the caller's assertion of his name, which may be input by his pressing keys on his telephone keypad or by simply speaking his name. If the ID claim has been received at 402, then at 403 the caller is prompted for a PIN. The PIN may be entered in the same manner as the ID claim. If the PIN has been received at 404, then at 405 it is determined whether the entered PIN matches the PIN for the entered ID claim. If not, an appropriate error message is output to user at 409, and the enrollment process fails. In that case, the user may be instructed to hang up and try again or to simply re-enter the ID claim and PIN. If there is a match at 405, then at 406 the system performs the password creation routine described above, which is also described further below. Next, at 407 the system confirms the password question and answer and, if confirmed by the caller, the password question and answer are stored in appropriate format at 408.

Figure 5:
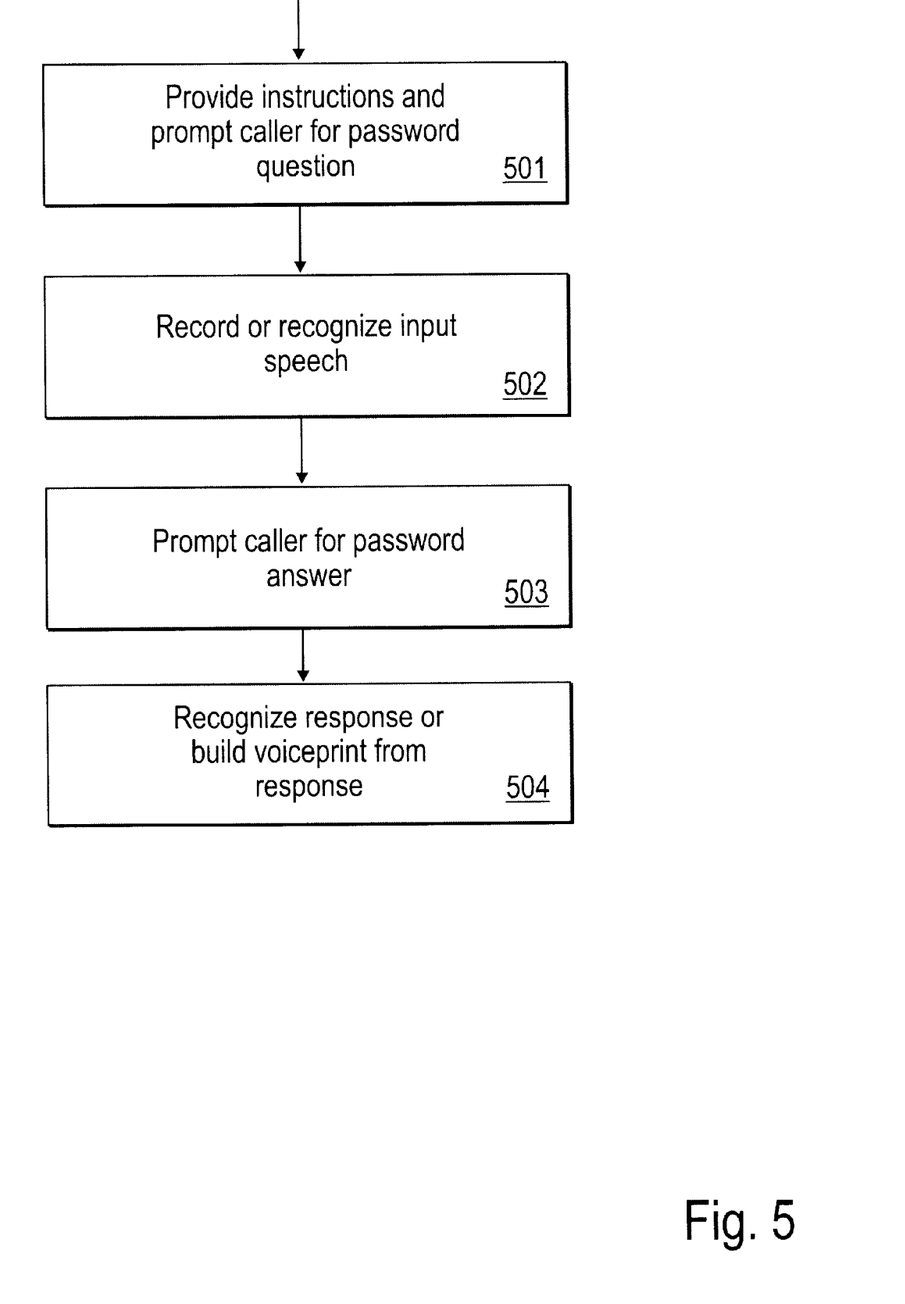
FIG. 5 is a flow diagram illustrating a routine for creating a password.

FIG. 5 shows the password creation routine of block 406, according to one embodiment. At 501, the system provides appropriate instructions and prompts the caller for the password question. At 502, the system records or recognizes the caller's response. At 503, the system prompts the caller for the password, which, the user is instructed, should be the proper answer to the password question. At 504, the system recognizes and stores the password using speech recognizer 35 or builds a voiceprint of the password.

Figure 6:
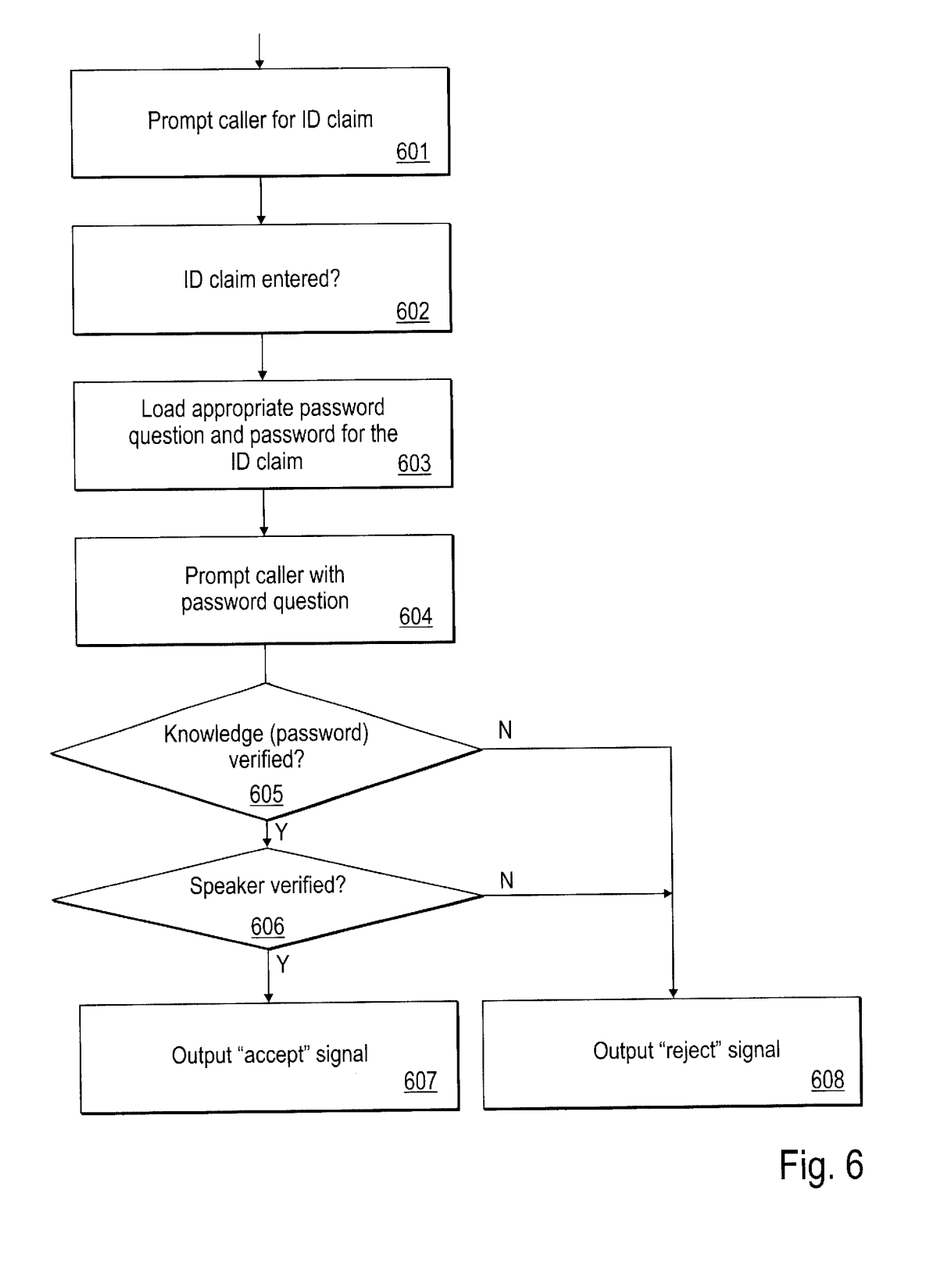
FIG. 6 is a flow diagram illustrating routine for voice-based password verification.

FIG. 6 shows a password verification routine that may be implemented by the computer system 1, according to one embodiment. The routine may be performed by the PCUI 24 in cooperation with the authentication software 22. At 601, the system prompts the caller for an ID claim. If an ID claim has been received at 602, then at 603 the system loads the appropriate password question and password for the received ID claim. At 604, the system prompts the caller with the password question; as noted above, this prompt may simply involve playback of the caller' recorded voice, or it may involve the use of a speech synthesizer, which converts a text string representing the password question to synthesized speech. At 605, the knowledge verifier 36 determines whether the content of the caller's response is correct based on input from the speech recognizer 35. At 606, the voice authenticator 39 verifies whether the voice of the caller is that of the person whose password has been loaded, based on stored voiceprints. If either the content is not correct or the voiceprint does not match, then the authentication software 22 outputs a "reject" signal to the application 21 at 608. If both the content of the password response and its voiceprint are verified, then the voice authentication software 22 outputs an "accept" signal to the application 21 at 607. The application 21 considers the identity of the caller to be verified only if an "accept" signal is received from both the knowledge verifier 36 and the voice authenticator 39, i.e., only if both the content of the password and the voiceprint are correct. Note that in an alternative embodiment, password verification may be performed without using speech recognizer 35 and knowledge verifier 36 at block 605; for example, verification may be performed by evaluating only a voiceprint of the user's password response against a stored voiceprint of the password obtained during the enrollment phase.

Thus, a method and apparatus have been described for facilitating cognitive recall of a password in a voice authentication system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A machine-implemented method of enrolling a user for voice authentication, the method comprising:

outputting a first prompt for eliciting a first utterance from the user;

receiving the first utterance;

storing the first utterance as a password prompt for the user;

outputting a second prompt for eliciting a second utterance from the user;
receiving the second utterance; and
storing the second utterance as a password corresponding to the password prompt.

2. A method as recited in claim 1, wherein said storing the first utterance as a password prompt comprises recording the first utterance as one or more waveforms.

3. A method as recited in claim 1, wherein said storing the first utterance as a password prompt comprises:
performing speech recognition on the first utterance to generate a text string; and
storing the text string.

4. A method as recited in claim 1, wherein said storing the second utterance as a password comprises generating a voiceprint from the second utterance.

5. A method as recited in claim 1, wherein said storing the second utterance as a password comprises:
performing speech recognition on the second utterance to generate a text string; and
storing the text string.

6. A machine-implemented method of performing voice authentication, the method comprising:
outputting a password prompt to the user, the password prompt representative of an utterance previously received from the user and corresponding to a password for the user; and
verifying the user based on whether a spoken response to the password prompt is received which matches the password.

7. A method as recited in claim 6, wherein said outputting the password prompt comprises outputting a recording of said utterance previously received from the user.

8. A method as recited in claim 6, further comprising determining whether the spoken response was provided by said user, wherein said verifying comprises establishing a verified condition only if it was determined that the spoken response matches the password and was provided by said user.

9. A method as recited in claim 6, wherein said verifying comprises comparing the spoken response to a voiceprint corresponding to the password.

10. A method as recited in claim 6, wherein said verifying comprises:
performing speech recognition on the spoken response to generate a first text string; and
comparing the first text string to a second text string representing the password.

11. A method of performing voice authentication, the method comprising:
enrolling a user for voice authentication by receiving from the user and storing a first voice input representing a password prompt for the user and a second voice input representing a correct response to the password prompt; and
performing password verification by outputting the password prompt and evaluating a response to the password prompt with respect to the correct response.

12. A method as recited in claim 11, further comprising determining whether the response to the password prompt was provided by said user, wherein said performing verification comprises establishing a verified condition only if it was determined that the response to the password prompt matches the correct response and was provided by said user.

13. A method as recited in claim 11, wherein said storing the first voice input comprises recording the first voice input as one or more waveforms.

14. A method as recited in claim 13, wherein said outputting the password prompt comprises outputting a recording of the first voice input based on said one or more waveforms.

15. A method as recited in claim 11, wherein said storing the first voice input comprises:
performing speech recognition on the first utterance to generate a text string; and
storing the text string.

16. A method as recited in claim 15, wherein said outputting the password prompt comprises:
generating machine-synthesized speech based on the text string; and
outputting the machine-synthesized speech as the password prompt.

17. A method as recited in claim 11, wherein said storing the second voice input comprises generating a voiceprint from the second voice input.

18. A method as recited in claim 11, wherein said storing the second voice input comprises:
performing speech recognition on the second voice input to generate a text string; and
storing the text string.

19. A method of performing voice authentication, the method comprising:
enrolling a user for voice authentication by:
outputting a first prompt to the user for eliciting a first utterance from the user, the first utterance representing a password prompt for the user;
receiving the first utterance;
storing the first utterance;
outputting a second prompt for eliciting a second utterance from the user, the second utterance representing a password corresponding to the password prompt;
receiving the second utterance; and
storing the second utterance; and
performing verification by:
outputting the password prompt; and
establishing a verified condition based on whether a spoken response to the password prompt is received which matches the password.

20. A machine-implemented method of performing voice authentication, the method comprising:
during an enrollment phase:
outputting a first audible prompt for eliciting a first utterance from a user;
receiving the first utterance;
storing the first utterance as a password prompt for the user;
outputting a second audible prompt for eliciting a second utterance from the user;
receiving the second utterance; and
storing the second utterance as a password for the user;
and, during a verification phase:
outputting a third audible prompt to the user, the third audible prompt representative of the password prompt;
determining whether a response to the third audible prompt is received which matches the password;
establishing a verified condition with respect to the user only if it was determined that the response to the third audible prompt matches the password.

21. A method as recited in claim 20, further comprising determining whether the response to the third audible prompt was provided by said user, wherein said establishing a verified condition with respect to the user comprises establishing the verified condition only if it was determined that the response to the third audible prompt matches the password and was provided by said user.

22. A method as recited in claim 20, wherein said storing the first utterance as a password prompt comprises recording the first utterance as one or more waveforms, and wherein said outputting the third audible prompt comprises outputting a recording of the first utterance based on the one or more waveforms.

23. A method as recited in claim 20, wherein said storing the first utterance as a password prompt comprises:
    performing speech recognition on the first utterance to generate a text string; and
    storing the text string;
    and wherein said outputting the third audible prompt comprises:
        generating machine-synthesized speech based on the text string; and
        outputting the machine-synthesized speech.

24. A method as recited in claim 20, wherein said storing the second utterance as a password comprises generating a voiceprint from the second utterance.

25. A method as recited in claim 20, wherein said storing the second utterance as a password comprises:
    performing speech recognition on the second utterance to generate a text string; and
    storing the text string.

26. A computer-implemented method of performing voice authentication, the method comprising, in a computer system:
    during an enrollment phase,
        establishing a telephone connection with a remote telephone unit operated by a user;
        transmitting a first audible prompt over the telephone connection, the first audible prompt for eliciting a first utterance from a user;
        receiving the first utterance from the user over the telephone connection;
        storing the first utterance as a password prompt for the user;
        transmitting a second audible prompt over the telephone connection, the second audible prompt for eliciting a second utterance from the user;
        receiving the second utterance from the user over the telephone connection; and
        storing the second utterance as a password for the user;
    and, during a verification phase subsequent to the enrollment phase,
        outputting a third audible prompt to the user over the telephone connection, the third audible prompt representative of the password prompt;
        determining whether a response to the third audible prompt is received which matches the password;
        establishing a verified condition with respect to the user only if it was determined that the response to the third audible prompt matches the password.

27. A method as recited in claim 26, further comprising determining whether the response to the third audible prompt was provided by said user, wherein said establishing a verified condition with respect to the user comprises establishing the verified condition only if it was determined that the response to the third audible prompt matches the password and was provided by said user.

28. A method as recited in claim 26, wherein said storing the first utterance as a password prompt comprises recording the first utterance as one or more waveforms.

29. A method as recited in claim 26, wherein said storing the first utterance as a password prompt comprises:
    performing speech recognition on the first utterance to generate a text string; and
    storing the text string.

30. A method as recited in claim 26, wherein said storing the second utterance as a password comprises generating a voiceprint from the second utterance.

31. A method as recited in claim 26, wherein said storing the second utterance as a password comprises:
    performing speech recognition on the second utterance to generate a text string; and storing the text string.

32. A device for performing voice authentication, the device comprising:
    enrollment means for enrolling a user for voice authentication, the enrollment means comprising:
        first output means for outputting a first prompt to the user for eliciting a first utterance from the user, the first utterance representing a password prompt for the user;
        first receiving means for receiving the first utterance;
        first storage means for storing the first utterance;
        second output means for outputting a second prompt for eliciting a second utterance from the user, the second utterance representing a password corresponding to the password prompt; and
        second receiving means for receiving the second utterance;
        second storage means for storing the second utterance; and
    verification means for verifying the user, the verification means comprising:
        third output means for outputting the password prompt to the user; and
        means for verifying the user based on whether a spoken response to the password prompt is received which matches the password.

33. A computer system comprising:
    a processor;
    an input/output (I/O) device coupled to the processor; and
    a storage device coupled to the processor and having sequences of instructions stored therein which can be executed by the processor to cause the computer system to:
        output a first prompt for eliciting a first utterance from a user using the I/O device;
        receive the first utterance using the I/O device;
        store the first utterance as a password prompt for the user;
        output a second prompt for eliciting a second utterance from the user using the I/O device;
        receive the second utterance using the I/O device; and
        store the second utterance as a password corresponding to the password prompt for verifying the user.

34. A computer system as recited in claim 33, wherein the storage device further has sequences of instructions stored therein which can be executed by the processor to cause the computer system to:
    output a third prompt to the user using the I/O device, the third audible prompt representative of the password prompt;
    determine whether a response to the third prompt is received which matches the password; and
    establish a verified condition with respect to the user only if it was determined that the response to the third prompt matches the password.

35. A computer system as recited in claim 33, wherein the I/O device comprises a first telephone unit for establishing a telephone connection with a remote telephone unit operated by the user, such that the first and second utterances and said response are received by the computer system over the telephone connection.

36. A machine-readable program storage medium tangibly embodying a sequence of instructions executable by the machine to perform a method for performing voice authentication, the method comprising:

during an enrollment phase:
outputting a first audible prompt for eliciting a first utterance from a user;
receiving the first utterance;
storing the first utterance as a password prompt for the user;
outputting a second audible prompt for eliciting a second utterance from the user;
receiving the second utterance; and
storing the second utterance as a password for the user;

and, during a verification phase:
outputting a third audible prompt to the user, the third audible prompt representative of the password prompt;
determining whether a response to the third audible prompt is received which matches the password;
establishing a verified condition with respect to the user only if it was determined that the response to the third audible prompt matches the password.

37. A voice authentication system comprising:

an enroller configured to enroll a user for voice authentication by receiving from the user and storing a first voice input representing a password prompt for the user and a second voice input representing a password response to the password prompt; and a password verifier configured to output the password prompt and to perform verification based on whether a third voice input representing a response to the password prompt is received which matches the password response.

38. A voice authentication system as recited in claim 37, further comprising:

a feature extractor configured to extract speech features from the first voice input; and a speech recognizer configured to generate recognized speech based on the extracted features.

39. A voice authentication system as recited in claim 37, further comprising:

a knowledge verifier configured to verify a content of the third voice input; and a speaker verifier configured to access a voiceprint to verify the content of the third voice input.

* * * * *